Oct. 3, 1933.     W. F. PENROSE     1,928,630
BRAKE
Filed March 17, 1930     2 Sheets-Sheet 2
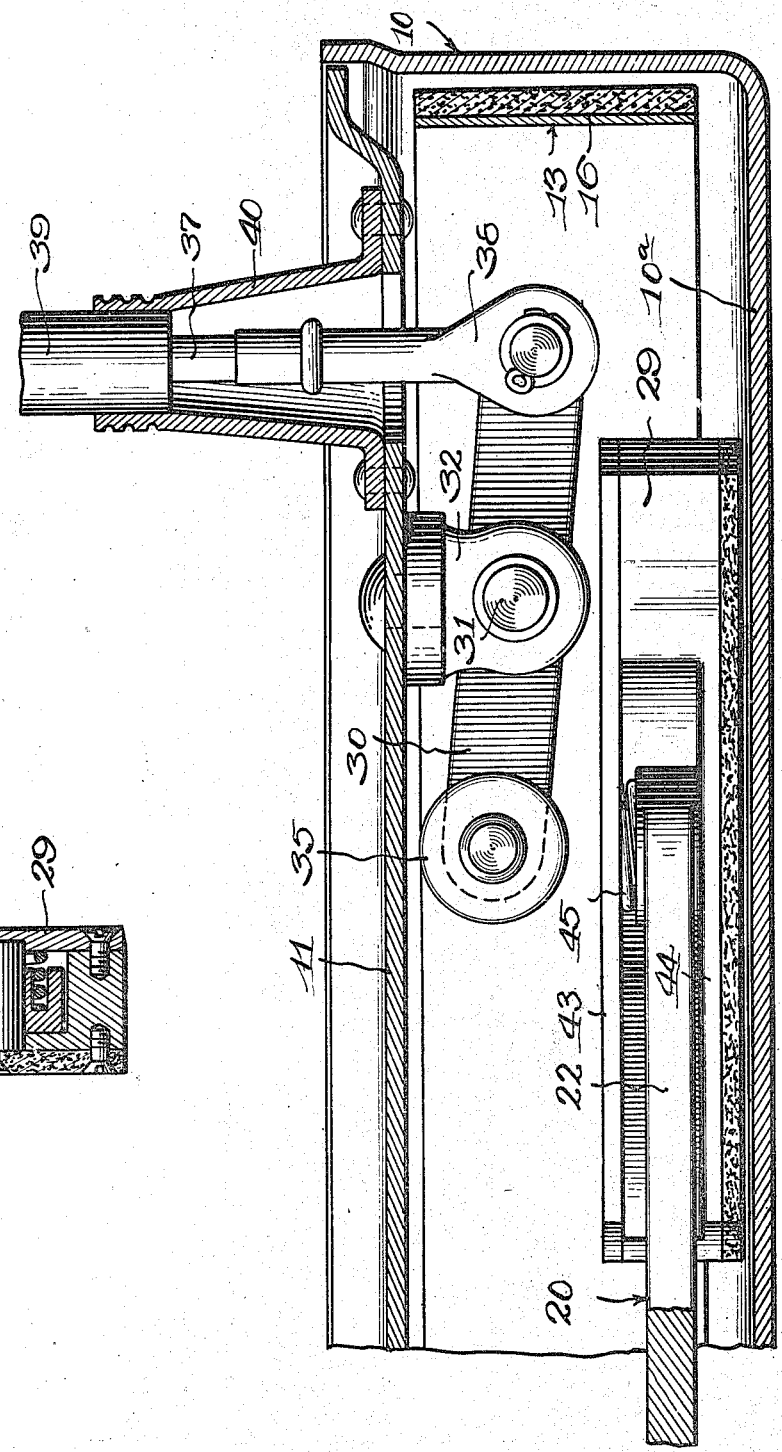
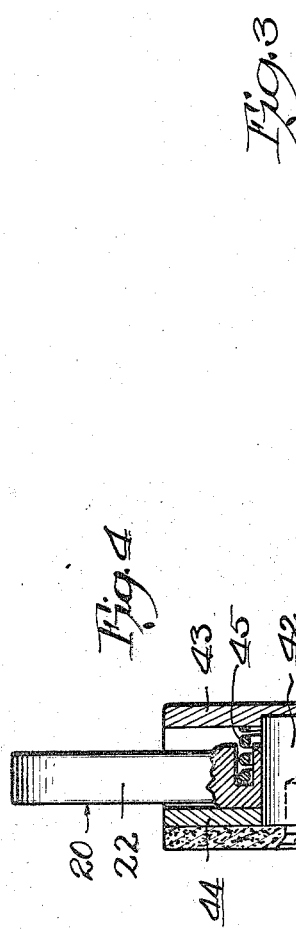
Inventor,
William F. Penrose Patented Oct. 3, 1933

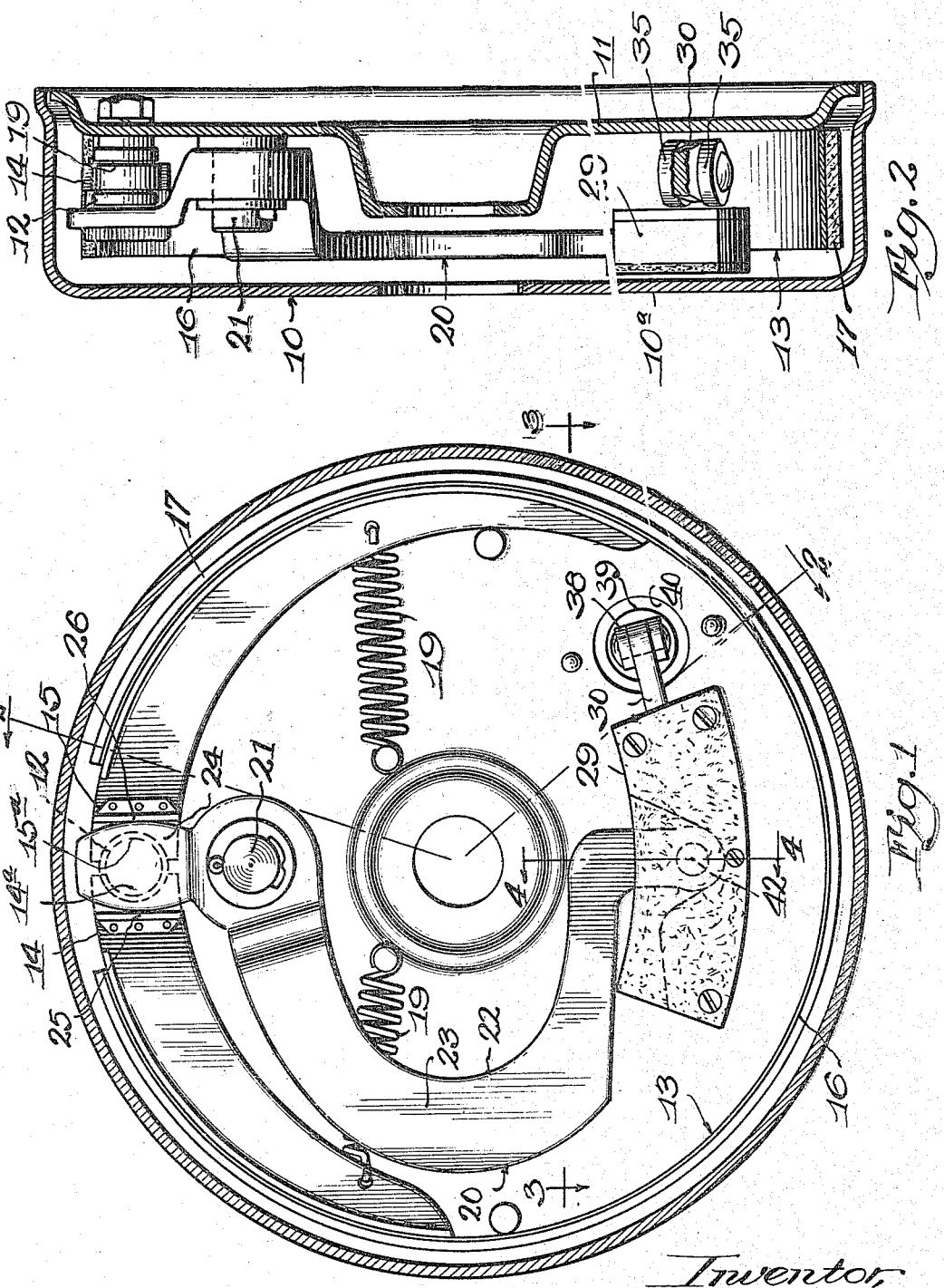

1,928,630

UNITED STATES PATENT OFFICE 1,928,630

BRAKE

William F. Penrose, Kenosha, Wis.

Application March 17, 1930. Serial No. 436,269

4 Claims. (Cl. 188—78)

This invention relates to improvements in brakes and more particularly to brakes of the self energizing type particularly adapted for automotive vehicles wherein the torque of the rotating part is utilized for applying the brake member.

The principal object of the invention is to provide an improved, simple, durable and efficient device of the character described.

The invention may best be understood by reference to the accompanying drawings in which Fig. 1 is a face view of a brake constructed in accordance with my invention, and showing the outer web of the brake drum removed.

Fig. 2 is a vertical section taken on line 2—2 of Fig. 1.

Fig. 3 is an enlarged detail section taken on line 3—3 of Fig. 1.

Fig. 4 is a detail section taken on line 4—4 of Fig. 1.

Referring to details shown in the drawings, the brake drum is indicated at 10 and forms part of the rotating wheel, while the backing plate 11, as usual, is suitably fixed to the axle. The adjacent parts of the wheel and the axle are not shown herein as they form no part of the present invention.

An anchor pin 12 is fixed on the backing plate 11. A brake shoe 13, herein of the semi-flexible band type, is mounted within the brake drum, with its two end pieces 14 and 15 suitably arranged to engage opposite sides of the anchor pin 12, depending upon the direction of rotation of the drum. In the form shown, the end pieces 14 and 15 each comprise upright webs extending a portion of the circumference of the axially extending band member 16 which forms the main body of the brake shoe 13. Brake lining 17 is mounted, as usual, on the outer surface of the band member 16.

The extremities of the end pieces 14 and 15 are preferably notched as at 14a and 15a to fit in a grooved portion 19 of the anchor pin 12, as shown in Fig. 2, so as to assist in retaining the brake band axially of the drum. Suitable tension means such as springs 19, 19 are provided for holding the brake in retracted position.

The actuating means for the brake shoe comprises a lever 20 pivoted on pin 21 fixed on the backing plate just inside the anchor pin 12, as is best shown in Figs. 1 and 2. The lever 20 swings in a plane substantially perpendicular to the axis of rotation of the brake drum, and comprises a relatively long arm 22 offset or bowed at 23 to pass around the axis of the wheel, and a shorter arm 24 extending between oppositely disposed flange 25 and 26, respectively, mounted on the end pieces 14 and 15 of the brake band 13.

An auxiliary brake member 29 is mounted for limited pivotal movement on the free end of lever arm 22 at a point substantially more than 90° from the pivot pin 21. Said brake member is adapted to be moved into frictional engagement with the upright web 10a of the brake drum 10 so as to actuate the lever 20 by torque from said brake drum, which in turn causes the shorter lever arm 24 to move one or the other end pieces 14 or 15 of the brake band away from the anchor pin 12, depending, of course, upon the direction of rotation of the brake drum.

Means are provided for moving the auxiliary brake member 29 into operative engagement with the brake drum web 10a, in the form shown said means comprising a rocking arm 30 pivoted on pin 31 carried by a bracket 32 on the backing plate 11, as is best seen in Fig. 3. A pair of rollers 35 are carried on the end of the lever 30 and normal registering with the rear face of the auxiliary brake member 27. Any suitable operating means may be provided for rocking the lever 30, in the preferred form shown, the operating movement being transmitted to the brake drum through a flexible cable 37 passing transversely through the backing plate 11, and connected by clevis 38 to the lever 30. Said cable is supported in a conduit 39 of the usual form, connected to nipple 40 fixed to said backing plate.

Means are preferably provided for yieldably mounting the auxiliary brake member 29 on the end of the main operating lever 20, so as to maintain said brake member out of engagement with the brake drum unless positively actuated by the rocking lever 30. As seen in Figs. 3 and 4, the longer lever arm 22 of said lever 20 is pivoted on a pin 42 between upper and lower plates 43 and 44 of said brake member, and yielding compression means, herein comprising a coil spring 45, is interposed between the lever arm 22 and the upper plate 43, so as to normally maintain the face of the brake member away from the brake drum web 10a.

With the construction above described, it will now be understood that the brake band 13 will be applied by forcing the auxiliary brake member 29 into frictional engagement with the rotating brake drum web 10a and the torque from said latter part will then be transmitted through the lever 20 to actuate one or the other free ends of the brake shoe to apply the brake. It will be especially noted in this connection, that by reason of the arrangement of the lever 20, with the auxiliary brake member at the opposite side of the axis of the wheel from the point of application of braking force, that the end of brake which is on the side of the anchor pin away from which the drum is rotating, will always be moved by the lever arm 24 in the same direction as the direction of rotation of said drum, while the other end of the brake will be firmly seated and anchored against the anchor pin. The brake is therefore of the servo type, and its operation is automatically and fully reversible, depending upon the direction of rotation of the wheel.

Although I have shown and described a certain embodiment of my invention, it will be understood that I do not wish to be limited to the exact construction illustrated and described, but that various changes and modifications may be made without departing from the spirit and scope of the invention.

I claim:

1. In a brake, a drum having an upright web, a backing plate, a brake shoe and an anchor therefor carried by said backing plate, and means for applying said brake comprising a lever pivotally mounted on said backing plate, and an auxiliary brake member supported by said lever at a point more than 90° from the point of pivotal connection of said lever on said backing plate, and means for moving said auxiliary brake member into frictional engagement with said upright web comprising a rocking lever having sliding engagement with the rear face of said brake member.

2. In a brake, a drum having an upright web, a brake member of the servo type having its opposite ends disposed adjacent each other, anchor means for said brake ends, and brake-applying means comprising a lever pivoted adjacent said anchor means and having a relatively short arm operatively engageable with both of said brake ends, and a relatively long arm extending beyond the axis of rotation of said drum, an auxiliary brake member supported on the end of said last-named lever arm, and means for moving said auxiliary brake member laterally into frictional engagement with said drum web, the arrangement being such that the torque of said drum is transmitted to one of said brake ends to move it in the same direction as the direction of rotation of said drum, while the other brake end is engaged with its respective anchor means.

3. In a brake, a drum, including an upright web, a backing plate, two brake members having their adjacent ends movable away from each other, anchor means for said brake members, and brake-applying means for selectively actuating said brake members comprising a lever pivoted on said backing plate and having a shorter arm operatively engageable with both of said brake ends, and a longer arm extending beyond the axis of rotation of said drum, an auxiliary brake member supported on the end of said last-named lever arm, and means for moving said auxiliary brake member into frictional engagement with said drum web, the arrangement being such that the torque of said drum is transmitted selectively to the brake end which extends toward the direction of rotation of said drum, and to move said brake end in the same direction as the direction of rotation of the drum.

4. In a brake, a drum having an upright web, a backing plate, a brake shoe and an anchor therefor carried by said backing plate, and means for applying said brake comprising a lever, a pivot pin fixed on said backing plate within said drum and about which pin said lever is pivoted, and an auxiliary brake member supported by said lever at a point more than 90° from the point of pivotal connection of said lever on said backing plate, and means for moving said auxiliary brake member into frictional engagement with said upright web.

WILLIAM F. PENROSE.